UNITED STATES PATENT OFFICE.

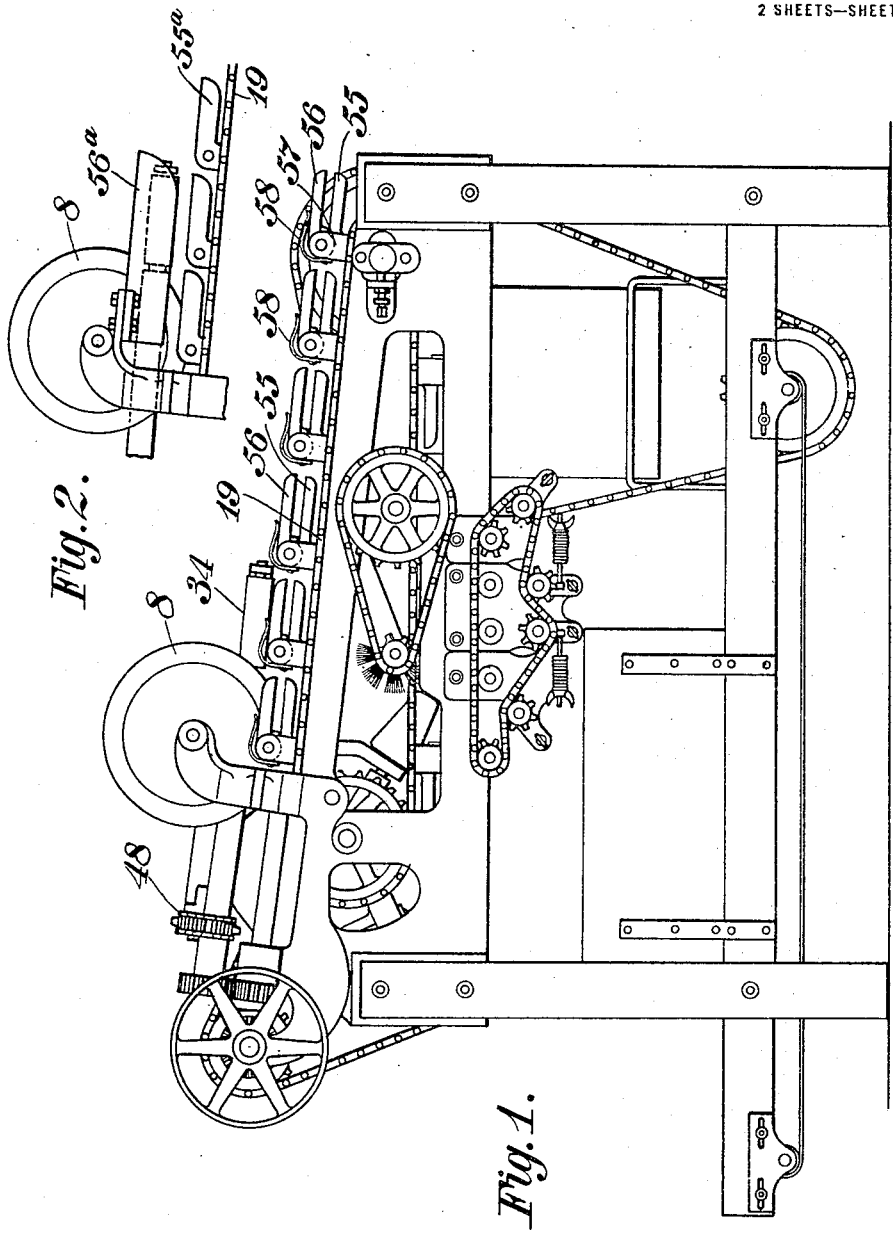

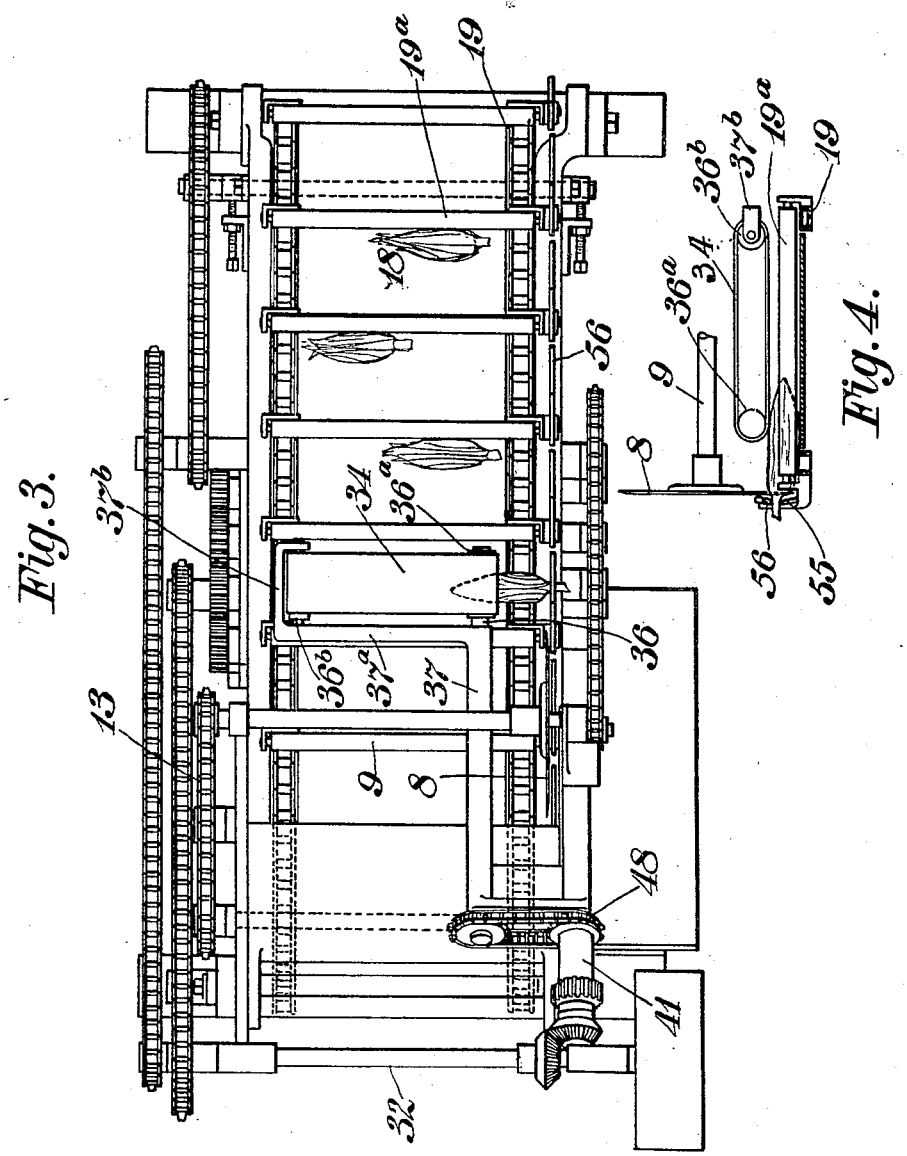

SAMUEL E. MORRAL AND WILLIAM W. MORRAL, OF MORRAL, OHIO.

CORN-HUSKING MACHINE.

1,283,541.  Specification of Letters Patent.  Patented Nov. 5, 1918.

Application filed April 6, 1917. Serial No. 160,106.

*To all whom it may concern:*

Be it known that we, SAMUEL E. MORRAL and WILLIAM W. MORRAL, citizens of the United States, residing at Morral, in the county of Marion and State of Ohio, have invented a certain new and useful Improvement in Corn-Husking Machines, of which the following is a specification.

This invention relates to corn husking machines which employ butt removing devices and has for one of its objects to provide improved means for moving the ear longitudinally with respect to itself toward the guide or gage and butt cutter or remover. Another object of the invention is to provide an improved gage or guide for determining the extent of said longitudinal movement and fixing the position of the ear when subjected or about to be subjected to the action of the butt remover.

The invention is embodied in the construction herein shown, set forth and finally claimed.

In the accompanying drawings—

Figure 1 is an elevation of that side of the machine which contains the guide and cutter.

Fig. 2 is a detail side view of a modification of the guiding or gaging means.

Fig. 3 is a plan view of the machine.

Fig. 4 is a detail illustrating the ear feeding and holding device.

In said views 18 designates the table upon which the ears are carried by a conveyer or belt 19 suitably equipped with bars 19ª to engage and carry the ears.

The character 8 designates a rotary knife or butt remover, said remover being fixed on a shaft 9 that is driven by a chain belt 13 receiving power from the main power shaft 32.

36 is a shaft journaled longitudinally of the table 18 and driven by a chain 48 from a counter shaft 41, the latter being driven by the main power shaft 32. The lower end of the shaft 36 is formed to constitute, or provided with, a belt roller 36ª. Said shaft 36 extends through the shank of a bracket or frame 37 having a lateral extension 37ª reaching to the opposite side of the table and at the extremity of said extension is a further extension 37ᵇ extending longitudinally of the table. In said extension are suitable bearings for a belt roller 36ᵇ like the roller 36ª. The rollers 36ª and 36ᵇ carry a belt 34 of any material suitable to frictionally engage an ear of corn. The shaft 36 is rotated so that the lower reach or flight of the belt 34 moves toward the side of the machine containing the butt remover, hence when an ear of corn with its butt end pointed toward the remover side of the machine is brought by the conveyer belt 19 to a position under the belt 34 the latter moves the ear longitudinally with respect to itself toward the gage and cutter. The advantage of the belt 34 is that it, as shown, extends substantially entirely across the table or conveyer and operates upon the ear however it may be placed. In other words it is not necessary for the workman to carefully place the ear on the bed at the butt remover side of the machine.

In the present instance the gage or guide or a part thereof for limiting the lengthwise movement of the ear and holding it in proper position for the removal of the butt is made movable with the conveyer belt. In Fig. 1 said gage or guide is shown as composed of two parts or fingers 55 and 56 the lower part 55 being fixed or extending rigidly from a short standard 57 cast with a link of the feed belt chain and the upper part 56 being hinged to said standard and held in parallel relation to the fixed part by means of a spring 58. These fingers 55 and 56 are placed in trailing relation to the ear feeding direction of the conveyer belt so as to be self-clearing of butts or pieces of husk. The advantage of the moving gage or guide is that the butt end is not caught and held while the other part moves forward as sometimes happens where a stationary guide is used. Where one of the gage fingers is spring-held as in Fig. 1 some accommodation to different sizes of butt is provided.

In Fig. 2 we have shown a movable guide member 55ª coöperating with a fixed guide member 56ª.

The parts are susceptible of modification without departing from the gist of the invention as claimed.

What we claim is:

1. In a machine for butting ears of corn, the combination with a butt removing means, and a conveyer for moving the ear in crosswise position toward the butt removing means, of a belt for urging the ear lengthwise of itself toward the butt removing means, said belt supported entirely above the conveyer and having its lower flight of a length substantially the width of the conveyer, said lower flight traveling transversely of the conveyer and being the operative portion thereof.

2. In a machine for butting ears of corn, the combination with a gage, a butt removing means, and a conveyer for moving the ear in cross-wise position toward the butt removing means, of a belt for urging the ear lengthwise of itself toward the gage and butt removing means, said belt supported entirely above the conveyer and having its lower flight of a length substantially the width of the conveyer, said lower flight traveling transversely of the conveyer and being the operative portion thereof.

3. In a machine for butting ears of corn, the combination with butt removing means, a conveyer belt for moving the ear in crosswise position toward the butt removing means, means for moving the ear transversely of the conveyer toward the butt removing means, and a traveling gage on the conveyer belt for positioning the ear with reference to the butt removing means.

4. In a machine for butting ears of corn, the combination with butt removing means, a conveyer belt for moving the ear in crosswise position toward the butt removing means, means for moving the ear transversely of the conveyer toward the butt removing means, and a gage for positioning the ear with reference to the butt removing means carried by the conveyer belt.

5. In a machine for butting ears of corn, the combination with butt removing means, a conveyer for moving the ear in crosswise position toward the butt removing means, means for moving the ear transversely of the conveyer toward the butt removing means, and a gage consisting of a pair of spaced fingers for positioning the ears with reference to the butt removing means carried by the conveyer.

6. In a machine for butting ears of corn, the combination with butt removing means, a conveyer for moving the ear in crosswise position toward the butt removing means, means for moving the ear transversely of the conveyer toward the butt removing means, and a gage carried by the conveyer consisting of a pair of spaced fingers one of which is yielding with reference to the other.

7. In a machine for butting ears of corn, the combination with butt removing means, a conveyer for moving the ear in crosswise position toward the butt removing means, means for moving the ear transversely of the conveyer toward the butt removing means, and a gage carried by the conveyer for positioning the ear with reference to the butt removing means, said gage consisting of a pair of spaced fingers connected at the forward end only.

8. In a machine for butting ears of corn, the combination with butt removing means, a conveyer belt for moving the ear in crosswise position toward the butt removing means, means for moving the ear transversely of the conveyer toward the butt removing means, and a gage member traveling with the belt to position the ear with reference to the butt removing means.

9. In a machine for butting ears of corn, the combination with a butt removing means, and a conveyer for moving the ear in crosswise position toward the butt removing means, of a belt for urging the ear lengthwise of itself toward the butt removing means, said belt supported entirely above the conveyer and having its lower flight the operative portion thereof.

SAMUEL E. MORRAL.
WILLIAM W. MORRAL.

Copies of this patent may be obtained for five cents each, by addressing the "Commissioner of Patents, Washington, D. C."